(12) United States Patent
LaBarge et al.

(10) Patent No.: US 6,774,080 B2
(45) Date of Patent: Aug. 10, 2004

(54) GAS TREATMENT DEVICE COMPRISING SMSI MATERIAL AND METHODS FOR MAKING AND USING THE SAME

(75) Inventors: William J. LaBarge, Bay City, MI (US); Richard F. Beckmeyer, Davisburg, MI (US); Joachim Kupe, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/303,616

(22) Filed: Nov. 25, 2002

(65) Prior Publication Data

US 2004/0101452 A1 May 27, 2004

(51) Int. Cl.$^7$ ................................................ B01J 31/00
(52) U.S. Cl. ........................ 502/170; 502/150; 502/201; 502/324; 502/327; 502/333; 502/334; 502/339; 423/213.5; 422/171
(58) Field of Search ................................ 502/170, 150, 502/201, 324, 327, 333, 334, 339; 423/213.5; 422/171

(56) References Cited

U.S. PATENT DOCUMENTS

| | | | |
|---|---|---|---|
| 3,919,120 A | | 11/1975 | Kato et al. |
| 4,149,998 A | * | 4/1979 | Tauster et al. ............... 502/328 |
| 4,402,869 A | * | 9/1983 | Tauster et al. ............... 502/324 |
| 4,617,289 A | | 10/1986 | Saito et al. |
| 5,338,515 A | * | 8/1994 | Dalla Betta et al. .......... 422/95 |
| 5,371,056 A | | 12/1994 | Leyrer et al. |
| 5,433,071 A | | 7/1995 | Willey et al. |
| 5,441,706 A | * | 8/1995 | Whittenberger ............. 422/174 |
| 5,480,854 A | * | 1/1996 | Rajaram et al. ............ 502/304 |
| 5,512,251 A | * | 4/1996 | Brunson et al. ............ 422/174 |
| 5,850,734 A | * | 12/1998 | Ketcham ..................... 60/274 |
| 5,863,508 A | * | 1/1999 | Lachman et al. ........... 422/171 |
| 5,905,056 A | | 5/1999 | Hartweg et al. |
| 5,948,723 A | * | 9/1999 | Sung .......................... 502/303 |
| 5,950,423 A | * | 9/1999 | Hampton ..................... 60/274 |
| 5,965,099 A | | 10/1999 | Hartweg et al. |
| 5,993,762 A | * | 11/1999 | Rajaram et al. ......... 423/213.2 |
| 6,077,483 A | * | 6/2000 | Locker et al. ............... 422/179 |
| 6,497,851 B1 | * | 12/2002 | Hu et al. ................. 423/213.5 |
| 2002/0071791 A | * | 12/2000 | Foster et al. |
| 2002/0121084 A1 | * | 3/2001 | Deeba |
| 2003/0051465 A1 | * | 9/2001 | Kolmanovsky et al. |

FOREIGN PATENT DOCUMENTS

EP 000763651 A1 * 9/1996

OTHER PUBLICATIONS

S. Fuentes, N. Bogdanchikova, M. Avalos–Borja, A. Boronin, M.H. Farias, G. Diaz, A.G. Cortes & A. Barrera "Structural and catalytic properties of Pd/Al2O3–La2O3 catalysts" Catalysis Today 2000, 55:3:301–309.

Mohamed, B.M., et al. "Kinetics and Mechanism of Formation of Tricalcium Aluminate, Ca3Al2O6" Thermochimica Acta 6944 (2002) pp. 1–10, Elsevier.

Anonymous "Exhaust Emissions Control Developments—A Selective Review of the Detroit 2001 SAE World Congress" Platinum Metals Review, 45, (2), 71–73.

Pocoroba et al. "Ageing of Palladium, Platinum, and Manganese–Based Combustion Catalysts for Biogas Applications" Catalysis Today, 2000, 59:1–2: 179–189 (Abstract Only).

Xu et al. "Catalytic Properties of Ni Modified Hexaaluminates LaNiyAl12–yO19–d for CO2 Reforming of Methane to Synthesis Gas" Applied Catalysis A: General, 2000, 198:1–2 267–273 (Abstract only).

Kim et al. "Synergistic Effect of Vanadium and Zirconium Oxides in the Pd–Only Three–way Catalysts Synthesized by Sol–Gel Method" Applied Catalysis A: General 2001, 207: 1–2 69–77 (Abstract Only).

McCarty et al. "Stability of Supported Metal and Supported Metal Oxide Combustion Catalysts" Catalysis Today 1999, 47:1–4:5–17 (Abstract Only).

Noh et al. "Characteristics of the Pd–Only Three–way Catalysts Prepared by Sol–Gel Method" Catalysis Today 1999, 53:4:575–582 (Abstract Only).

Dancheva et al. "TPSR, TPR, and TPO Studies of Pd–V2O5/Al2O3 Catalysts in Complete Catalytic Oxidation of Benzene" Collection of Czechoslovak Chemical Communications, Abstracts: 1994 59(9), 1922–1930.

Ryndin et al. "Effects of the Interaction of Dispersed Metal Particles with the Support in Catalysts Prepared Using Organometallic Compounds. VI. Study of the State of Components in (Pd+Zr)/SiO2" Applied Catalysis, V63, n 1, Aug. 1, 1990, p. 51–65 (Abstract Only).

(List continued on next page.)

Primary Examiner—S J Bor
Assistant Examiner—William G. Wright, Sr.
(74) Attorney, Agent, or Firm—Jimmy L. Funke

(57) ABSTRACT

A gas treatment device, comprises a substrate disposed within a shell. The substrate comprises a catalyst composition comprising a support, a catalyst, and a sufficient amount of SMSI material such that, upon exposure to a gas stream (at a gas treatment device operating temperature), less than or equal to about 35 wt % of hydrocarbons in the gas stream are burned.

A method for forming a gas treatment device, comprises applying a slurry to a substrate, wherein the slurry comprises a support and a sufficient amount of SMSI material such that, upon exposure to a gas stream at a gas treatment device operating temperature, greater than or equal to about 50 wt % of hydrocarbons in the gas stream are cracked to a light fraction; applying a catalyst to the substrate; calcining the catalyst; and disposing the calcined substrate into a shell, with a retention material disposed between the shell and the calcined substrate.

23 Claims, No Drawings

OTHER PUBLICATIONS

Yusuke et al. "Promoter Effect of Lanthana on MgO Supported Ruthenium Catalysts for Ammonia Synthesis" Research on Chemical Intermediates, V24, N5, Pt4, 1998, p 593–603 (Abstract Only).

Shaobin et al. "CO2 Reforming of Methane on Ni Catalysts: Effects of the Support Phase and Preparation Technique" Applied Catalysis B: Environmental, V16, N3, Apr. 20, 1998 Elsevier, Sci B.V., Amsterdam, Netherlands, p269–277 (Abstract Only).

Leisenberger et al. "Probing the Metal Sites of a Vanadium Oxide–Pd(111) 'inverse catalyst': Adsorption of CO" Surface Science, v444, n1, 2000, Elsevier Science B.V., Amsterdam, Netherlands, p 211–220 (Abstract Only).

Bogdanchikova et al. "Structural Properties of Pd Catalysts Supported on Al2O3–La2O3 Prepared by Sol–Gel Method" Applied Catalysis B: Environmental, v17, n3, Jul. 13, 1998, Elsevier B.V., Amsterdam, Netherlands, p 221–231 (Abstract Only).

Wachs et al. "Interaction of V2O5 and Nb2O5 with Oxide Surfaces" Solid State Ionics, v32–33, n pt 2, Feb.–Mar., 1989, p 904–910 (Abstract Only).

Yip et al. "Pulsed Laser Deposition of Epitaxial SrVO3 Films on (100)LaAlO3 and (100)Si" Materials Research Society Symposium—Proceedings, Materials Science of Novel Oxide–Based Electronics, Apr. 24–27 2000, San Francisco, CA (Abstract Only).

Takeno et al. "Structural Irregularity of the Stacking Sequence in the Sr3V2O7 Compound" Journal of Alloys and Compounds, V 187, n 1, Aug. 27, 1992, p 31–37 (Abstract Only).

Garcia–Jaca et al. "Synthesis Crystal Structure, Stoichiometry and Magnetic Properties of (Ca1–xSrx)Vo3" Materials Research Bulletin, v 34, n 2, 1999 Elsevier Science Ltd., Engl, p 289–301 (Abstract Only).

Rabinowitz et al. "The Effect of Sulfur and Ceria on the Activity of Automotive Pd/Rh Catalysts" Applied Catalysis A: General, v 212, n 1–2, Apr. 30, 2001, p 215–222 (Abstract Only).

Suhonen et al. "Characterization of Alumina Supported Pd Catalysts Modified by Rare Earth Oxides Using X–ray Photoelectron Spectroscopy and X–ray Diffraction: Enhanced Thermal Stability of PdO in Nd/Pd Catalysts" Applied Catalysis A: General, v 207, n 1–2, Feb. 2001, Elsevier Science Publishers B.V., Amsterdam, Netherlands, p 113–120 (Abstract Only).

Neyertz et al. "Preparation of Binary Palladium–Vanadium Supported Catalysts from Metal Acetylacetonates" Colloids and Surfaces A: Physicochemical and Engineering Aspects, v 136, n 1–2, Apr. 1998, Elsevier Science Publishers B.V., Amsterdam, Netherlands, p 63–69 (Abstract Only).

Unknown, "Study on Changing the Properties of Metallic–Oxide Films for Increasing the Hydrogen Permeability" M Amano Physical Properties Division Apr. 1991 to Mar. 1994 (Abstract Only).

Edilson et al. "FTIR Study of Hydrogen and Carbon Monoxide Adsorption on Pt/Tio2' Pt/ZrO2' and Pt/Al2O3" Langmuir, v15, n23, 1999 ACS, Washington, DC, USA, p 8140–8146 (Abstract Only).

Kunimori et al, "Preparation of Niobates of Rhodium and Nickel and their Catalytic Behaviors During Calcination and Reduction Treatments" Catalysis Today, v 16, n 3–4, May 3, 1993, p 387–395 (Abstract Only).

Massing et al, "Modelling of the Behavior of a Three Way Catalytic Converter at Steady State. Influence of the Propene Diffusion Inside the Catalytic Layer" Chemical Engineering Science, v55, n9, 2000, Elsevier Science, Ltd., Exeter, Engl, p 1707–1716 (Abstract Only).

Kim et al. "Effect of pH in a Sol–Gel Synthesis on the Physicochemical Properties of Pd–alumina Three–Way Catalyst" Applied Catalysis B: Environmental, v26, n4, Jun. 5, 2000, Elsevier Publishers B.V., Amsterdam, Netherlands, p 285–289 (Abstract Only).

* cited by examiner

GAS TREATMENT DEVICE COMPRISING SMSI MATERIAL AND METHODS FOR MAKING AND USING THE SAME

BACKGROUND OF THE INVENTION

Since the advent of emissions standards for internal combustion engines for cars, trucks, and other vehicles, emissions of hydrocarbons (HC), carbon monoxide (CO), and nitrogen oxides ($NO_x$) have markedly declined. This decline has been brought about through the use of a variety of techniques including electronic fuel injection, electronic engine control, and the use of a variety of catalytic converters to oxidize HC and CO, and to reduce $NO_x$ to nitrogen. However, increasingly more stringent emissions standards require even less pollutants in the gas emissions over extended periods of engine operation.

With these tighter emissions requirements, it is essential to form a catalyst capable of reaching its minimum operating temperature almost immediately upon starting the engine. Close-coupled catalytic converters, which are located in the engine compartment, i.e., beneath the hood and adjacent to the exhaust manifold, are of prime investigative interest as the principal function of a close coupled catalyst is to reduce hydrocarbon emissions during the cold start phase, which is defined as the period immediately after staring the engine from ambient conditions, and which last for about 2 minutes. The cold start period depends on the ambient temperature, the type of engine, the engine control system, and engine operation.

An inherent problem typically associated with close coupled catalytic converters is their tendency to quickly corrode, a result of their exposure to high temperatures, e.g., over about 1,000° C., to which the converters are exposed. Close coupled catalytic converters typically contain a catalytic material deposited on a support. The catalytic material, such as, for example, palladium, is preferably in the form of an oxide rather than the pure metal, as oxides have greater catalytic activity.

However, at temperatures of about 800° C., temperatures that are easily reached in close-coupled catalytic converters, the palladium oxide, for example, decomposes to palladium, which is catalytically less active than are the oxide forms. Consequently, HC, CO, and hydrogen ($H_2$) decomposition greatly decreases when the palladium oxide is decomposed to palladium metal.

Current problems also exist with regard to the slight attraction that typical supports, such as lanthanum oxide and aluminum oxide, exhibit towards palladium and rhodium metal and oxide forms. Due to the slight attraction, the catalytic material is capable of migrating across the support, and then forming dispersed agglomerated particles, thereby reducing the surface area of the palladium and rhodium. This migration is even more drastic at temperatures in excess of about 1,000° C. As catalytic activity is dependent on the exposure of a large surface area of the catalytic material, the formation of these dispersed agglomerated particles decreases the exposed surface area by about 10 times or greater, and, hence, decreases catalytic activity. In addition, at temperatures exceeding about 1,000° C., typical supports, such as lanthanum oxide, aluminum oxide, and the like, have only a slight attraction for palladium oxide and rhodium oxide, and even less attraction for palladium metal and rhodium metal. Therefore, there exists a need to increase the efficiency of catalytic converters by preserving the life-span of those catalytic materials necessary for the reduction of pollutants in gas emissions.

SUMMARY OF THE INVENTION

Disclosed herein is a gas treatment device comprising a catalyst composition disposed on a substrate to form an SMSI-coated substrate, wherein the catalyst composition includes an SMSI material and a support; a shell disposed around the SMSI-coated substrate; and a retention material disposed between and in physical communication with the substrate and the shell; wherein the gas treatment device can withstand temperatures up to about 1,150° C.

Further disclosed herein is a method for forming a close-coupled catalytic converter comprising forming a slurry comprising an SMSI material and a support; applying the slurry to a substrate to form a coating; calcining the coating to about 1,000° C. in a water-containing atmosphere to form an SMSI-coated substrate; disposing the SMSI-coated substrate into a housing; disposing a retention material concentrically between and in physical communication with the housing and the SMSI-coated substrate to form a unit; and positioning the unit into the close-coupled position of a stoichiometric gasoline engine.

The above described and other features are exemplified by the detailed description.

DESCRIPTION OF THE PREFERRED EMBODIMENT

The catalyst composition comprises a strong metal support interaction (SMSI) material, a catalyst, and a support, as well as an optional stabilizing agent. SMSI materials include those materials (e.g., oxides) that interact with the catalyst to reduce the catalytic activity of the catalyst with resect to hydrocarbons such that the catalyst cracks the hydrocarbon, forming light fraction hydrocarbons (e.g., hydrocarbons comprising less than or equal to about 2 carbon atoms, instead of combusting substantially all (e.g., greater than or equal to about 95 weight percent (wt %) of the hydrocarbons. SMSI materials form a catalyst composition that combusts less than or equal to about 10 wt % of the hydrocarbons, based upon the total amount of the hydrocarbons in the stream exposed to the catalyst composition (even when the catalyst composition is disposed in a manifold mounted or close coupled gas treatment device). Possible SMSI materials include niobium oxide, tungsten oxide, cerium oxide, vanadium carbide, vanadium oxide ($V_2O_5$), lithium-vanadium oxide (e.g., of the formula $LiV_3O_8$), vanadyl salt (e.g., vanadate(s) of ammonium, acetate, oxalate, and/or nitrate, with nitrates preferred), vanadium-aluminum solid solution, and vanadium-zirconium solid solution, and the like, as well as combinations comprising at least one of the foregoing SMSI materials. Silica and titania are preferably not employed due to their ability to poison the catalyst, inhibiting any conversion of the hydrocarbons. Consequently, the catalyst composition is preferably free of silica and titania, i,e, less than 0.1 wt % silicon oxide and/or titanium oxide, based upon the total weight of the composition.

A sufficient amount of SMSI material in the catalyst composition to reduce the amount of burned hydrocarbons (at the operating temperature of the gas treatment device comprising the SMSI material) to less than or equal to about 35 wt %, with less than or equal to about 25 wt % preferred, based upon the total weight of hydrocarbons entering the gas treatment device. Additionally, cracking greater than or equal to about 50 wt % of the hydrocarbons to light fraction, based upon the total amount of the hydrocarbons in the stream exposed to the catalyst composition, is also preferred. Preferably, a sufficient amount of SMSI material is employed to crack greater than or equal to about 75 wt % of the hydrocarbons to light fraction, with greater than or equal to about 85 wt % of the hydrocarbons more preferred, and greater than or equal to about 95 wt % of the hydrocarbons even more preferred, based upon the total amount of the hydrocarbons in the stream exposed to the catalyst composition. Generally, the SMSI material is employed in an amount of about 0.01 wt % to about 2 wt %, based upon the total weight of the catalyst composition. Within this range, the amount of SMSI material is preferably greater than or equal to about 0.1 wt %, with greater than or equal to about 0.4 wt % more preferred, and greater than or equal to about 0.6 wt % even more preferred. Also preferred within this range, is less than or equal to about 1.5 wt % SMSI material, with less than or equal to about 1 wt % more preferred, and less than or equal to about 0.8 wt % even more preferred.

In addition to the SMSI material, the catalyst composition further comprises a support. The support can comprise various support materials capable of withstanding the operating conditions and providing sufficient surface area to the catalyst. Preferably the support comprises an alumina, such as gamma alumina, delta alumina, theta alumina, hexaaluminates, and the like, as well as combinations comprising at least one of these supports. For greater stability and catalyst composition life, the support can be a stabilized support by incorporating a stabilizer into the support structure. Possible stabilizers include barium, calcium, lanthanum, and the like, as well as oxides, and combinations comprising at least one of the foregoing stabilizers. For example, the support can comprise hexaaluminate comprising less than or equal to about 5 wt % barium or lanthanum incorporated into the hexaaluminate crystalline structure, based upon the total weight of the support, with less than or equal to about 4 wt % barium or lanthanum incorporated into the hexaaluminate crystalline structure preferred.

Possible stabilized hexaaluminates for use as SMSI material supports, in order of preference the crystal stabilizers, may comprise barium ($BaAl_{12}O_{19}$), strontium ($SrAl_{12}O_{19}$) and magnesium ($MgAl_{12}O_{19}$). Rare earth stabilized hexaaluminates, in order of preference the crystal stabilizers, may comprise lanthanum ($LaAl_{11}O_{18}$), praseodymium ($PrAl_{11}O_{18}$) and cerium ($CeAl_{11}O_{18}$). The combination of Group IIa and rare earths stabilizers particularly includes barium-lanthanum ($Ba_{0.5}La_{0.7}Al_{11}O_{18}$) and strontium-lanthanum ($Sr_{0.8}La_{0.2}Al_{11}O_{18}$). Some base metal activated and stabilized hexaaluminates, may include the base metals manganese, nickel, iron and the like, and rare earths or Group IIa stabilizers, and combinations in order of preference such as lanthanum-manganese ($LaMnAl_{11}O_{19}$), barium-manganese ($Ba_xMn_{1-x}Al_{12}O_{19}$), lanthanum-nickel ($LaNiAl_{11}O_{19}$), barium-nickel ($Ba_xNi_{1-x}Al_{12}O_{19}$), lanthanum-iron ($LaFeAl_{11}O_{19}$) and barium-iron ($Ba_xFe_{1-x}Al_{12}O_{19}$).

Generally, the support is present in the catalyst composition in an amount of about 80 wt % to about 98 wt %, based upon the total weight of the catalyst composition. Within this range, the amount of support is preferably greater than or equal to about 90 wt %, with greater than or equal to about 93 wt % more preferred, and greater than or equal to about 96 wt % even more preferred. Also preferred within this range, is less than or equal to about 97.5 wt % support, with less than or equal to about 97 wt % more preferred.

The catalyst of the catalyst composition may include metals, such as platinum, palladium, rhodium, iridium, ruthenium, gold, nickel, manganese, copper, oxides thereof, alloys thereof, and the like, as well as combinations comprising at least one of the foregoing, and other catalysts, with manganese, gold, platinum, palladium, ruthenium, rhodium, iridium, oxides thereof, alloys thereof, and combinations comprising at least one of the foregoing catalysts preferred. More preferred catalysts include oxides, alloys and combinations comprising at least one of palladium, ruthenium, platinum, and rhodium especially preferred.

Due to the desire to crack the hydrocarbons instead of burn the hydrocarbons, the catalysts are present in amounts of less than or equal to about 100 grams per cubic foot ($g/ft^3$) of substrate, e.g., about 5 $g/ft^3$ to about 100 $g/ft^3$, with about 10 $g/ft^3$ to about 75 $g/ft^3$ preferred, and about 15 $g/ft^3$ to about 35 $g/ft^3$ especially preferred. In other words, the catalyst is present in an amount of about 0.16 wt % to about 3.12 wt %, based upon the total weight of the composition (excluding solubles) with about 0.32 wt % to about 2.35 wt % preferred, and about 0.48 wt % to about 1.1 wt % more preferred.

In order to inhibit support grain growth, a stabilizing agent can also be employed in the catalyst composition. It is believed that the stabilizing agent separates the support particles, thereby inhibiting grain growth. Possible stabilizing agents include yttria, zirconia, barium oxide, calcium oxide, strontium oxide, and the like, as well as combinations comprising at least one of the foregoing stabilizing agents. The stabilizing agent is optionally present in an amount of less than or equal to about 15 wt %, preferably in an amount of about 0.1 wt % to about 12 wt %, based upon the total weight of the catalyst composition. Within this range, the amount of stabilizing agent is preferably greater than or equal to about 0.5 wt %, with greater than or equal to about 2.0 wt % more preferred, and greater than or equal to about 4.0 wt % even more preferred. Also preferred within this range, is less than or equal to about 12.0 wt % stabilizing agent, with less than or equal to about 10.0 wt % more preferred, and less than or equal to about 8.0 wt % even more preferred.

When employed in a gas treatment device, the catalyst composition is typically disposed on and/or throughout a substrate to form an SMSI-coated substrate. The SMSI coated substrate is concentrically disposed within a shell or housing with a retention material disposed therebetween. The substrate can comprise any material designed for use in a spark ignition or diesel engine environment and having the following characteristics: (1) capable of operating at temperatures up to about 600° C., and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support the catalyst composition. Some possible substrates (e.g., catalyst substrate, filters, and the like) include ceramic (e.g., cordierite, alumina, and the like), metallic, cermet, and carbides (e.g., silica carbide, and the like), suicides, nitrides (e.g., silica nitride, and the like), in the form of foils, porous structures (e.g., sponges, porous glasses, foams, molecular sieves, and the like), perform, mat, fibrous material, pellets, particles, and the like (depending upon the particular device), and mixtures comprising at least one of the foregoing materials and forms, wherein metal foils are particularly preferred, especially stainless steel metal foils. For example, possible substrates include metallic foils, open pore alumina sponges, and porous ultra-low expansion glasses. A preferred substrate for the catalyst composition disclosed herein is a cordierite or metal foil.

Although the substrate can have any size or geometry, the size and geometry are preferably chosen to optimize surface area in the given converter design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Located between the substrate and a shell can be a retention material that insulates the shell from both the high exhaust gas temperatures and the exothermic catalytic reaction occurring within the catalyst substrate. The retention material, which enhances the structural integrity of the substrate by applying compressive radial forces about it, reducing its axial movement and retaining it in place, is typically concentrically disposed around the substrate to form a retention material/substrate subassembly. The retention material, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials and other materials such as organic binders and the like, or combinations comprising at least one of the foregoing materials.

The shell or housing disposed around the substrate is chosen depending upon the type of exhaust gas, the maximum temperature reached by the substrate, the maximum temperature of the exhaust gas stream, and the like. Suitable materials for the shell can comprise any material that is capable of resisting under-car salt, temperature, and corrosion. Typically, ferrous materials are employed such as ferritic stainless steels. Ferritic stainless steels can include stainless steels such as, e.g., the 400—Series such as SS-409, SS-439, and SS-441, with grade SS-409 generally preferred.

Also similar materials as the shell, end cone(s), end plate(s), exhaust manifold cover(s), and the like, can be concentrically fitted about the one or both ends and secured to the shell to preferably provide a gas tight seal. These components can be formed separately (e.g., molded or the like), or can be formed integrally with the housing using a methods such as, e.g., a spin forming, or the like.

The emission control device can be formed by wash coating, imbibing, impregnating, physisorbing, dipping, spraying, painting, chemisorbing, precipitating, or otherwise applying the catalyst composition to the substrate. The substrate can then be heat treated, and disposed within the shell, with the retention material disposed therebetween. In one embodiment, formation of the catalyst composition comprises forming a slurry of the support, catalyst, SMSI material, and optionally the stabilizing agent in a solvent such as water. Once the slurry has been applied to the substrate, the substrate is preferably can be heated to a sufficient temperature and for a sufficient time to calcine the catalyst and form a de-greened catalyst. For example, the substrate can be heated to a temperature of about 1,000° C. to about 1,200° C. for about 10 minutes to about 4 hours. Preferably, calcining occurs in a water-containing atmosphere. For example, a relative humidity during calcining (at the furnace temperature) of greater than or equal to about 80%, with greater than or equal to about 90% preferred, and greater than or equal to about 98% more preferred.

In another embodiment, formation of the catalyst composition comprises forming a slurry of the support, SMSI material, and optionally the stabilizing agent in the solvent. Once the slurry has been applied to the substrate, the substrate is calcined in temperatures of about 900° C. to about 1,100° C. typically for about 2 hours to about 6 hours. Preferably, calcining occurs in a water-containing atmosphere. For example, at the calcination temperature, a relative humidity of greater than or equal to about 90% is preferably employed, with greater than or equal to about 97% more preferred, and greater than or equal to about 100% especially preferred. The calcined substrate is then doped with the catalyst. Preferably the doping is at a pH of greater than or equal to about 9, with a pH of about 9 to about 13 preferred, and a pH of about 10 to about 12 more preferred. Once the slurry has been applied to the precious metals have been doped onto the washcoat supported on the substrate, the substrate/washcoat/precious metal is calcined in temperatures of about 300° C. to about 600° C. typically for about 2 hours to about 6 hours.

Prior to depositing the catalyst composition onto the substrate, the substrate can be treated. Optionally, the substrate can be treated with a phosphate solution and then calcined prior to introduction of the catalyst composition. For example, a phosphate solution can wash coated, imbibed, impregnated, physisorbed, chemisorbed, precipitated, coated, sprayed, painted, or otherwise applied to the substrate. Excess phosphate solution can be removed, e.g., via a vacuum, and the coated substrate can be calcined.

Once the substrate with the catalyst composition has been formed and disposed within the shell, with the retention material disposed therebetween to form a device, it can be employed in a vehicle or other device needing treatment of a gaseous stream. This present catalyst composition is particularly useful in the treatment of hydrocarbons, e.g., in a diesel environment, where it is desirable to crack the hydrocarbons for subsequent use in NOx reduction. Consequently, the device comprising the catalyst composition ("composition device") is preferably employed in a close coupled (e.g., in the exhaust line adjacent to the manifold (e.g., typically about 8 to about 15 inches from the manifold)), or a manifold mounted position. In other words, the composition device is preferably located upstream of a NOx adsorber and optionally a sulfur trap, particular filter, catalytic converter, and combinations comprising at least one of the foregoing. One possible configuration (described in the exhaust flow direction) is a close coupled composition device, sulfur trap and/or particulate filter (in either order), and NOx adsorber, with a catalytic converter disposed downstream of the NOx adsorber.

EXAMPLES

Example 1) A cordierite honeycomb substrate with 600 cells per square inch (c/in$^2$) and cell wall thickness of 2 millimeters (mm) was dipped into a zirconium phosphate solution. The cordierite substrate cells were cleared of excess zirconium phosphate by vacuum. The zirconium phosphate coated substrate was calcined for 2 hours at 500° C. The zirconium phosphate coated cordierite monolith was coated with 7.0 grams per cubic inch (g/in$^3$) aqueous slurry containing solids of barium hexaalumninate. The monolith/washcoat was calcined for 4 hours at 500° C. The washcoated monolith was post impregnated with a palladium sulfate and vanadium sulfate solution. The dried and calcined monolith had a washcoat of 4.0 g/in$^3$ barium hexaluminate, 35 grams per cubic foot (g/ft$^3$) palladium, and 35 g/ft$^3$ vanadium.

Example 2) A metal monolith was coated with 7.0 g/in$^3$ slurry containing solids of 87.2 wt % barium hexaaluminate, 4 wt % barium oxide, 3 wt % strontium oxide, 3 wt % lanthanum oxide, and 2 wt % zirconium oxide. The monolith with washcoat was calcined for 4 hours at 500° C. The finished monolith had a washcoat of 3.52 g/in 3barium hexaaluminate, 0.16 g/in³ barium oxide, 0.12 g/in³ strontium oxide, 0.12 g/in³ lanthanum oxide, 0.08 g/in³ zirconium oxide, 35 g/ft³ palladium, and 35 g/ft³ vanadium.

Example 3) A metal monolith was coated with 7.0 g/in³ slurry containing solids of 45.5 wt % barium hexaaluminate, 44.7 wt % lanthanum hexaaluminate, 4 wt % barium oxide, 3 wt % strontium oxide, 2 wt % zirconium oxide, 0.8 wt % palladium sulfate, and 0.8 wt % vanadium sulfate. The monolith with washcoat was calcined 4 hours at 500° C. The finished monolith had a washcoat of 3.52 g/in³ barium hexaaluminate, 0.16 g/in³ barium oxide, 0.12 g/in³ strontium oxide, 0.12 g/in³ lanthanum oxide, 0.08 g/in³ zirconium oxide, 35 g/ft³ palladium, and 35 g/ft³ vanadium.

Example 4) A metal monolith was coated with 7.0 g/in³ slurry containing solids of 90.2 wt % praseodyiniumn-manganese hexaaluminate, 4 wt % barium oxide, 3 wt % strontium oxide, 2 wt % zirconium oxide, 0.8 wt % rhodium nitrate. The monolith with washcoat was calcined at 500° C. for 4 hours. The finished monolith had a washcoat of 3.52 g/in³ barium hexaaluminate, 0.16 g/in³ barium oxide, 0.12 g/in³ strontium oxide, 0.12 g/in³ lanthanum oxide, 0.08 g/in³ zirconium oxide, and 35 g/ft³ rhodium.

5) Barium hexaaluminate powder was doped with rhodium nitrate and calcined at 500° C. for 4 hours. A 0.04 wt % loading of rhodium was obtained after calcination. Lanthanum hexaalumninate powder was doped with palladium nitrate and calcined at 500° C. for 4 hours. A 0.40 wt % palladium loading was obtained after calcination. A metal monolith was coated with a zirconium phosphate solution then calcined at 500° C. for 4 hours. The metal monolith with zirconium phosphate layer was coated with 7.0 g/in³ slurry containing solids of 45.5 wt % rhodium doped barium hexaaluminate, 44.7 wt % palladium doped lanthanum hexaaluminate, 4 wt % barium oxide, 3 wt % strontium oxide, 2 wt % potassium oxide and 2 wt % zirconium oxide. The monolith with washcoat was calcined at 500° C. for 4 hours. The finished monoliths had a washcoat of 3.52 g/in³ barium hexaaluminate, 0.16 g/in³ barium oxide, 0.12 g/in³ strontium oxide, 0.12 g/in³ lanthanum oxide, 0.08 g/in³ zirconium oxide and 35 g/ft³ palladium, and 35 g/ft³ rhodium.

The employment of the catalyst composition enables further reduction of NOx versus converters that burn the hydrocarbons. Converters without the SMSI material typically burn about 60 wt % to about 90 wt % of the hydrocarbons (in the exhaust stream exiting the engine) upstream of a NOx adsorber. These non-SMSI systems typically have an exhaust stream from the NOx adsorber comprising NOx in amounts exceeding about 60 ppm. In contrast, when the SMSI catalyst composition is employed, less than or equal to about 35 wt % of the hydrocarbons are burned and the amount of NOx expelled from the system is less than or equal to about 5 ppm, with less than or equal to about 1 ppm achievable.

Other advantages of the catalyst composition include the binding of the catalyst to the support by the SMSI material, thereby hindering catalyst migration that reduces the activity of the catalyst due to a lower availability of catalyst sites and to non-uniformity of the catalyst loading; and the increase in thermal stability of the catalyst composition such that it can withstand temperatures in excess of about 1,000° C.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas treatment device, comprising:
   a substrate disposed within a shell, the substrate comprising a catalyst composition comprising a support, a catalyst, and a sufficient amount of SMSI material such that, upon exposure to a gas stream at a gas treatment device operating temperature, less than or equal to about 35 wt % of hydrocarbons in the gas stream are burned.

2. The gas treatment device of claim 1, wherein the SMSI material is selected from the group consisting of niobium oxide, tungsten oxide, cerium oxide, vanadium carbide, vanadium oxide, lithium-vanadium oxide, vanadyl salt, vanadium-alumina solid solution, vanadium-zirconia solid solution, and combinations comprising at least one of the foregoing SMSI materials.

3. The gas treatment device of claim 1, wherein the SMSI material comprises at least one vanadate of ammonium, a vanadium salt of acetate, oxalate, and nitrate.

4. The gas treatment device of claim 1, wherein the SMSI material comprises vanadium oxide.

5. The gas treatment device of claim 1, wherein the support comprises at least one of alumina and hexaaluminate.

6. The gas treatment device of claim 1, wherein the catalyst is selected from the group consisting of platinum, palladium, rhodium, iridium, ruthenium, gold, nickel, manganese, copper, oxides thereof, alloys thereof, and combinations comprising at least one of the foregoing catalysts.

7. The gas treatment device of claim 5, wherein the catalyst is selected from the group consisting of manganese, gold, platinum, palladium, ruthenium, rhodium,iridium, oxides thereof, alloys thereof, and combinations comprising at least one of the foregoing catalysts.

8. The gas treatment device of claim 1, wherein the catalyst composition further comprises a stabilizing agent selected from the group consisting of yttrium oxide, zirconium oxide, barium oxide, calcium oxide, strontium oxide, and combinations comprising at least one of the foregoing stabilizing agents.

9. The gas treatment device of claim 5, wherein the support comprises hexaaluminate.

10. The gas treatment device of claim 8, wherein the stabilizing agent comprises barium oxide.

11. The gas treatment device of claim 1, wherein less than or equal to about 25 wt % of the hydrocarbons in the gas stream are burned.

12. The gas treatment device of claim 11, wherein less than or equal to about 10 wt % of the hydrocarbons in the gas stream are burned.

13. The gas treatment device of claim 1, wherein upon exposure to a gas stream at a gas treatment device operating temperature, the catalyst composition is capable of cracking greater than or equal to about 50 wt % of the hydrocarbons to light fraction, based upon the total amount of the hydrocarbons in the gas stream exposed to the catalyst composition.

14. The gas treatment device of claim 13, wherein the catalyst composition is capable of cracking greater than or equal to about 75 wt % of the hydrocarbons to light fraction.

15. The gas treatment device of claim 14, wherein the catalyst composition is capable of cracking greater than or equal to about 85 wt % of the hydrocarbons to light fraction.

16. The gas treatment device of claim 15, wherein the catalyst composition is capable of cracking greater than or equal to about 95 wt % of the hydrocarbons to light fraction.

17. The gas treatment device of claim 1, wherein the catalyst composition is free of silica and titania.

18. The gas treatment device of claim 2, wherein the catalyst composition comprises about 0.01 wt % to about 2 wt % of the SMSI material, based upon the total weight of the catalyst composition.

19. The gas treatment device of claim 18, wherein the catalyst composition comprises about 0.1 wt % to about 1.5 wt % of the SMSI material.

20. The gas treatment device of claim 19, wherein the catalyst composition comprises about 0.4 wt % to about 1 wt % of the SMSI material.

21. The gas treatment device of claim 1, wherein the catalyst composition comprises about 5 $g/ft^3$ to about 100 $g/ft^3$ of the catalyst.

22. The gas treatment device of claim 21, wherein the catalyst composition comprises about 10 $g/ft^3$ to about 75 $mg/ft^3$ of the catalyst.

23. The gas treatment device of claim 22, wherein the catalyst composition comprises about 15 $g/ft^3$ to about 35 $g/ft^3$ of the catalyst.

* * * * *